Dec. 29, 1964 R. C. MAXANT 3,162,991
CUTTING APPARATUS
Filed Jan. 9, 1963
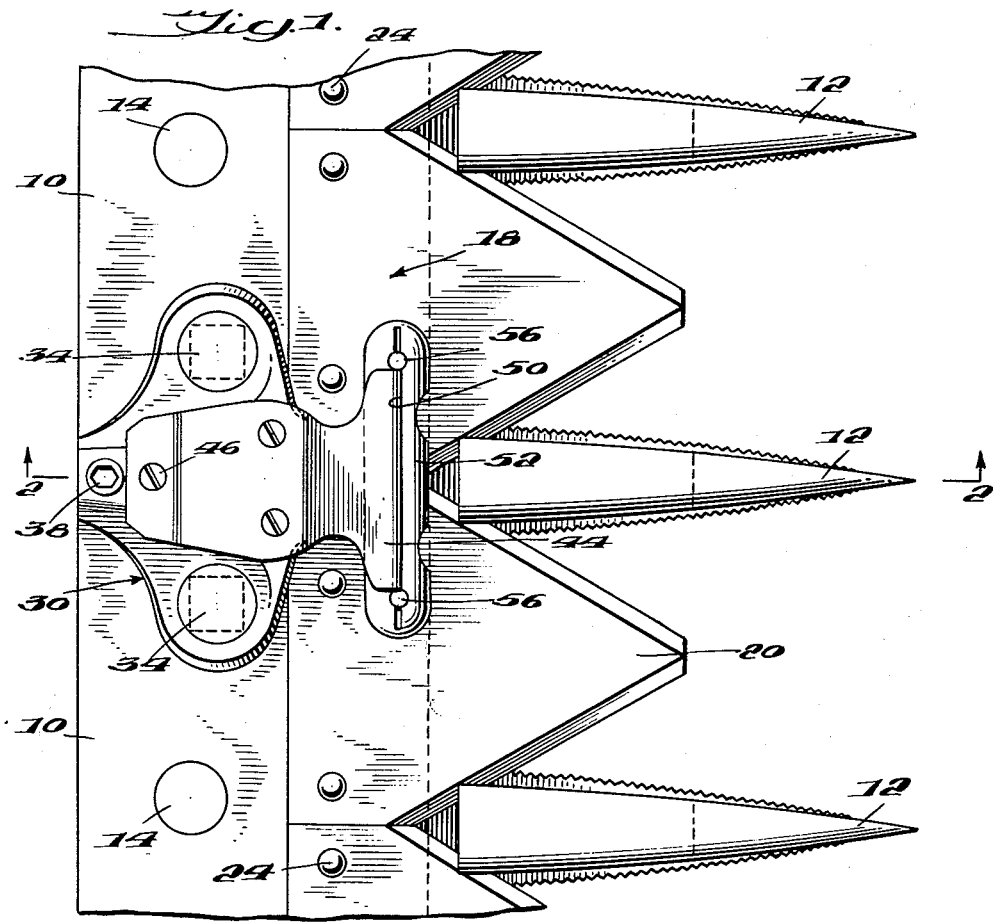
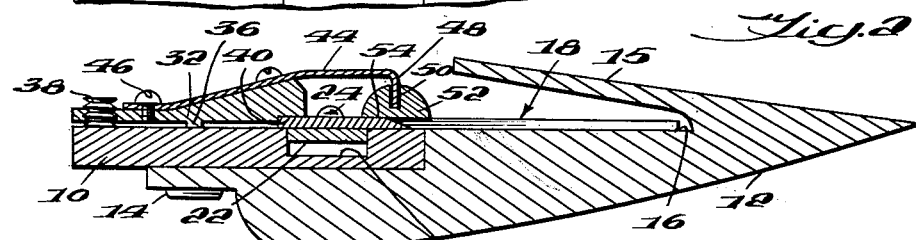
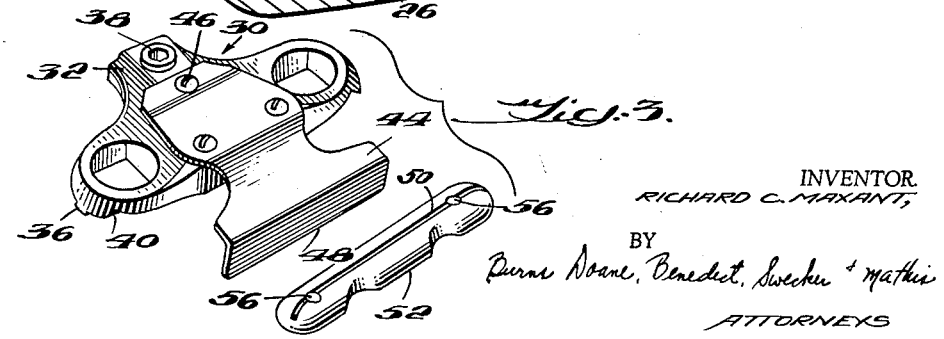
INVENTOR.
RICHARD C. MAXANT,
BY
Burns, Doane, Benedict, Swecker & Mathis
ATTORNEYS 3,162,991
CUTTING APPARATUS
Richard C. Maxant, Ayer, Mass., assignor to H. & R. Manufacturing Co., Ayer, Mass., a sole proprietorship of Richard C. Maxant
Filed Jan. 9, 1963, Ser. No. 250,435
2 Claims. (Cl. 56—305)

This invention relates to cutting apparatus of the type employing a reciprocating blade, and more particularly to apparatus for aligning and holding such a blade in proper relationship with the supporting structure.

In cutters or mowers of the type employing a reciprocating blade of well-known construction, it is necessary that the blade be held in relationship with the supporting structure in a manner in which friction is at a minimum, and wherein the holding forces on the blade can be adjusted, but wherein the blade is held firmly in the desired position. Previous constructions for mounting cutting blades have employed various types of construction which have not proved to be entirely satisfactory. This is especially true where the cutter is used for cutting grass, weed, brush, etc. Any unnecessary clearance between the co-acting members results in jamming or clogging, and the slightest adjustment which brings the members together under unnecessary pressure may result in overheating and cause excessive friction which in turn quickly dulls the fine cutting edges of the blade so that further efficient cutting is impossible.

It is a principal object of this invention to provide a mounting assembly for a cutter blade wherein spring pressure can be applied automatically over a constant bearing area with respect to the blade in order to minimize friction and uneven wear of the co-acting parts, and wherein the spring pressure can be adjusted in a relatively simple manner to achieve maximum cutting efficiency.

Another object of this invention is to provide a mounting assembly for cutter blades wherein the blade teeth can be removed easily for sharpening or replacement, and wherein worn out portions of the assembly can be replaced easily.

Another object of this invention is to provide a mounting assembly for cutter blades which can be applied to existing cutters and mowers.

These objects may be achieved by applying, to a conventional type of cutter or mower, a blade mounting assembly comprising a mounting block to which is securely attached an elongated flat spring member which presses against a bearing block which in turn engages the cutter blade to hold it in the desired position. The mounting block is connected on the finger bar of a conventional cutter or mower in such a manner that it can be adjusted by a set screw to change the pressure which the spring applies to the bearing block. A depending tongue on the spring fits into an elongated slot in the bearing block so that the bearing block in effect is free to pivot about the tongue of the spring. In this manner, the bearing or contact surface between the bearing block and the top of the cutter blade remains constant, and premature wear and unnecessary binding is eliminated.

This embodiment of the invention is illustrated in the accompanying drawings, in which:

FIG. 1 is a plan view of an intermediate portion of a cutter or mower showing a blade mounting assembly of this invention thereon;

FIG. 2 is a section view along line 2—2 of FIG. 1; and

FIG. 3 is a perspective view of a portion of the blade mounting assembly.

A portion of a conventional cutter or mower, illustrated in FIGS. 1 and 2, includes an elongated finger bar 10 to which is mounted at points spaced therealong a series of guard fingers 12 connected to the finger bar 10 as by rivets 14. Each finger guard 12 is pointed at its forward end and has an upwardly projecting guard 15 extending over a flat surface 16 aligned with the top flat surface of the finger bar 10. A cutter blade 18 is made up of a series of individual teeth 20 attached to a longitudinally extending guide bar 22 by rivets 24. The guide bar 22 extends in a longitudinal channel 26 in the finger bar 10. The finger bar 10 in effect forms a stationary support member for the blade 18.

A group of blade mounting assemblies 30 of this invention are attached to the finger bar 10 at various points therealong. Each mounting assembly 30 includes a mounting block 32 attached to the finger bar 10 by a pair of bolts 34 aligned longitudinally of the finger bar 10. An elongated projection 36 extends from the bottom face of the mounting block 32 generally in line with the bolts 34 and rests on the flat top surface of the finger bar 10. The projection 36 forms a pivot about which the mounting block can rotate. Rotational adjustment of the mounting block is achieved by turning a set screw 38 which extends through the rear of the mounting block and bears on the top surface of the finger bar 10. The front bottom portion of the mounting block 32 is notched longitudinally, as shown at 40, to receive the rear edge of the cutter blade 18. Suitable clearance is provided between the front bottom portion of the mounting block at 40 and the blade in order to allow the mounting block to be adjusted.

A flat spring member 44 is securely attached to the top of the mounting block by suitable screws 46. The spring 44 extends forwardly of the mounting block 32, generally parallel with the blade 18, and depends downwardly toward the blade 18 into a tongue portion 48 at a point over the mid section of the blade 18. The tongue 48 of the spring 44 fits into an elongated slot or groove 50 in an elongated bearing block or pad 52. The slot 50 is suitably proportioned so that the tongue 48 fits loosely therein and engages the bottom of the slot in such a manner that the bearing block 52 is free to pivot slightly about the tongue 48. The depth of interengagement of the tongue 48 with the walls of the slot 50 is greater than the thickness of the blade 18 so that the block 52 will not drop off the tongue when the blade 18 is removed lengthwise of the bar 10 for replacement or sharpening. A bottom, flat surface 54 of the bearing block 52 rests directly on the top surface of the blade 18. Longitudinal movement of the bearing block 52 with respect to the tongue 48 is limited by members 56 which close off the ends of the slot 50, or the slot 50 may be otherwise closed at the ends thereof, as desired.

The guide bar 22, located within the elongated groove 26, together with the notches 40 in the several mounting blocks 32 and the bearing blocks 52 on the top of the blade 18, cooperate to hold the blade in the desired position on the finger bar 10, and yet allow the blade to reciprocate lengthwise along the finger bar 10. Suitable mechanism (not illustrated) is attached to the blade 18 for reciprocating it in a conventional manner so that the individual teeth 20 cooperate with the finger guides 12 to provide a cutting action. The spring pressure applied by the spring 44 to the bearing block 52 can be adjusted as necessary by turning the set screw 38 in order to achieve the most efficient cutting action.

No matter what position each mounting block 32 is rotated into by adjustment of the set screw 38, the tongue 48 of the spring 44 will allow the corresponding bearing block 52 to maintain a constant bearing or contact area on the top of the cutter blade. Because the bottom surface 54 of the bearing block 52 can remain in face-to-face sliding engagement with the top surface of the blade 18, and because this bearing area is relatively large, there is a minimum amount of wear between the bearing block 52 and the blade 18. The spring 44 is rigid in a longitudinal direction with respect to the blade 18 but can flex towards and away from the plane of the blade 18. The direction of bevel of the leading edges of the teeth 20 assure that the blade 18 will be forced downwardly by objects and material engaging or clogging the blade. Consequently, the blade 18 will not be forced upwardly against the force of the spring 44.

The series of mounting asemblies 30 which are aligned along the finger bar 10 affords considerable over-all bearing or contact area for holding the blade 18 in place. The force of each spring 44 can be adjusted easily, and yet the pivoting of the spring does not cause the bearing block 52 to rotate out of face-to-face engagement with the top of the cutter blades. This is because of the loose fit betwen the tongue 48 and the slot 50.

The spring 44 is positioned relatively close to the top of the blade 18 and below the guard 15, and therefore there is little chance that cuttings can become lodged therein. Because the top of the spring 44 is relatively flat, cuttings will easily pass over the mounting assembly 30.

The mounting assemblies 30 will allow for convenient removal of the teeth 20 for sharpening or replacement. Additionally, because the bearing blocks 52 are not permanently attached to the springs 44, the blocks 52 can be replaced with ease, if replacement is necessary. The simplicity of the mounting assemblies allows them to be manufactured at minimum cost, and they are readily mounted to existing types of cutters or mowers.

While the invention has been illustrated and described in a preferred embodiment, variations and changes may be made without departing from the invention as set forth in the claims.

I claim:

1. A device for use in mounting a movable blade with respect to a stationary member, said device comprising a block adapted to be mounted on a stationary member, an elongated spring having one end fixed on the block and a tongue portion on the other end of the spring, a protrusion on the block extending from the surface thereof into abutting relation with the stationary member and about which the block can pivot relative to said stationary member, screw means on the block opposite from the spring tongue portion for pivotally adjusting the block with respect to the stationary member on which the block is adapted to be mounted, and bearing means having a flat surface adapted to contact a blade in face-to-face engagement and having a slot opposite said surface, said tongue portion of the spring fitting loosely into said slot to allow pivotal movement between the tongue portion and the bearing means.

2. A device for use in mounting a blade for movement with respect to a stationary member, comprising a block mounted on the stationary member, a rib on the underside of the block forming a rocking support therefor on the stationary member, means for adjusting said block with respect to the stationary member, an elongated flat leaf spring fixed at one end to the block and extending therefrom over the blade, said leaf spring having a tongue on the opposite end thereof extending downwardly approximately at right angles to the length of the spring, and a bearing block in slidable bearing relation with the top surface of the blade, said bearing block having a groove in the top surface thereof, said tongue extending edgewise into the groove for yieldably holding the bearing block against the blade.

References Cited by the Examiner
UNITED STATES PATENTS

| | | | |
|---|---|---|---|
| 828,404 | 8/06 | Hopkins | 56—305 |
| 828,502 | 8/06 | Pope | 56—305 |
| 870,358 | 11/07 | Griffiths | 56—305 |
| 2,269,527 | 1/42 | Frederickson | 56—305 |
| 3,052,078 | 9/62 | Padgett | 56—305 |

T. GRAHAM CRAVER, *Primary Examiner.*

ANTONIA F. GUIDA, ARNOLD RUEGG, *Examiners.*